(No Model.) 3 Sheets—Sheet 1.

H. W. KIRCHNER & G. N. CHASE.
MEANS FOR TRANSPORTATION.

No. 441,672. Patented Dec. 2, 1890.

WITNESSES.
Jos. W. Crookes,
Wm. M. Byrne.

INVENTOR.
Henry William Kirchner
George N. Chase by
Paul Bakewell
their attorney (No Model.) 3 Sheets—Sheet 2.

H. W. KIRCHNER & G. N. CHASE.
MEANS FOR TRANSPORTATION.

No. 441,672. Patented Dec. 2, 1890.

WITNESSES.
Jos. W. Crookes.
Wm. M. Byrne.

INVENTOR.
Henry William Kirchner
George N. Chase
by Paul Bakewell
their attorney

THE NORRIS PETERS CO., PHOTO-LITHO., WASHINGTON, D. C.

(No Model.) 3 Sheets—Sheet 3.

H. W. KIRCHNER & G. N. CHASE.
MEANS FOR TRANSPORTATION.

No. 441,672. Patented Dec. 2, 1890.

WITNESSES. INVENTOR.

UNITED STATES PATENT OFFICE.

HENRY W. KIRCHNER, OF DENVER, COLORADO, AND GEORGE N. CHASE, OF THE UNITED STATES ARMY.

MEANS FOR TRANSPORTATION.

SPECIFICATION forming part of Letters Patent No. 441,672, dated December 2, 1890.

Application filed May 2, 1890. Serial No. 350,339. (No model.)

*To all whom it may concern:*

Be it known that we, HENRY WILLIAM KIRCHNER and GEORGE N. CHASE, (said CHASE of the United States Army,) citizens of the United States, residing, respectively, at Denver, in the county of Arapahoe and State of Colorado, and at Lancaster, in the county of Los Angeles and State of California, have invented certain new and valuable Improvements in Means for Transportation, of which the following is a full, clear, and exact description.

Our invention relates to that class of railways in which the roadway is elevated above the ground; and it consists in features of novelty hereinafter described.

The objects of our invention are, first, to make the roadway or track and supports comparatively light and inexpensive; second, to avoid the necessity of grading; third, to furnish the means of transit more rapid than has heretofore been attained, and, fourth, to reduce the possibilities of derailing of the car and attendant danger in rapid transit to a minimum. We attain the first of these objects and as a consequent result the second by making use of hydrogen gas as a means for compensation for the weight of the car and its occupants or contents. In this case the motive power need be used only to propel the car, the track or tracks being used only as guides, there being but little weight and consequent traction friction to overcome, and the line of the roadway be made comparatively straight, the necessity of grading being obviated we attain our third object. We attain our fourth object by putting an upper and lower rail or guide on both sides of the roadway and suspending the car between them, connecting the car to the rails or guides by placing clamping grooved pulleys, attached to either side of the car, one above the upper and one below the lower rail or track.

Figure 1:
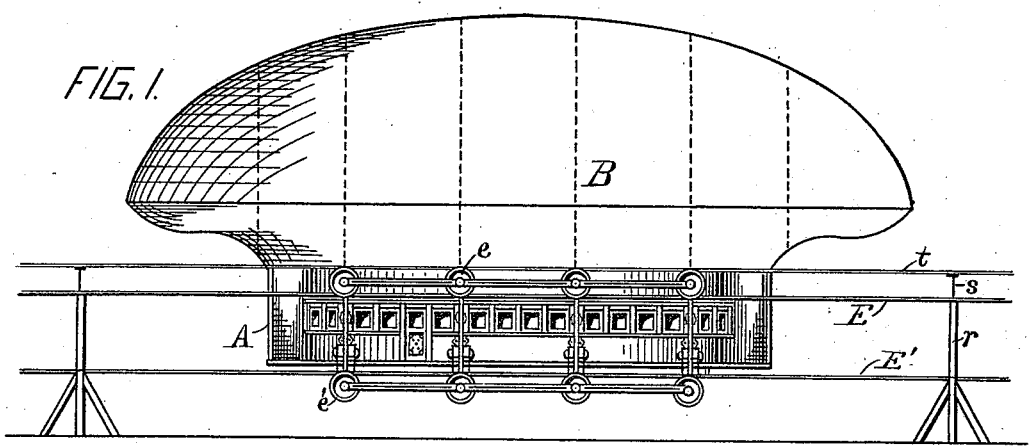
Figure 2:
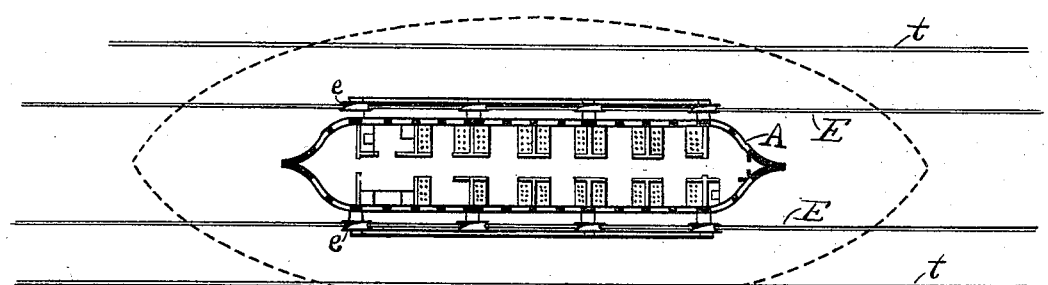
Figure 3:
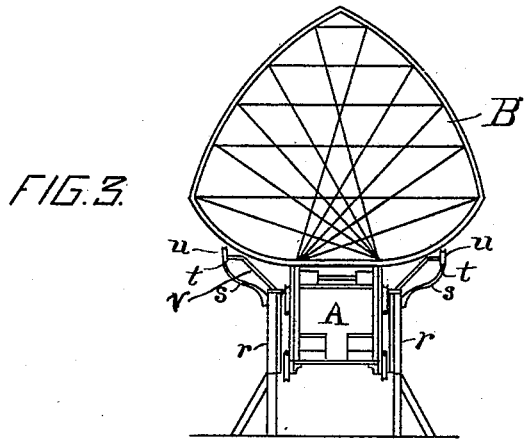
Figure 4:
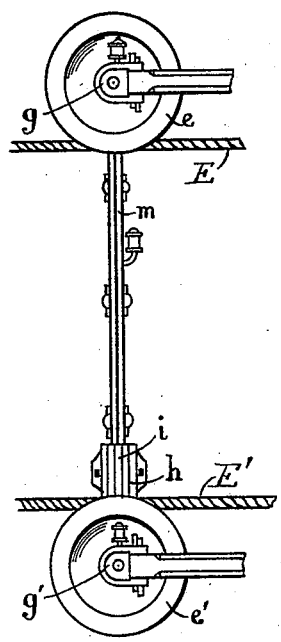
Figure 5:
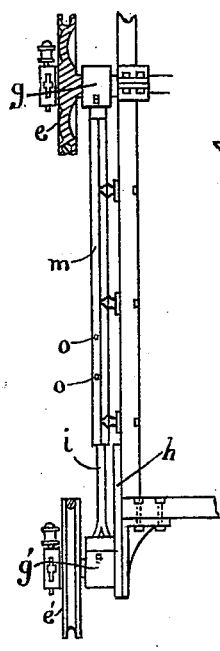
Figures 6, 7, 8:
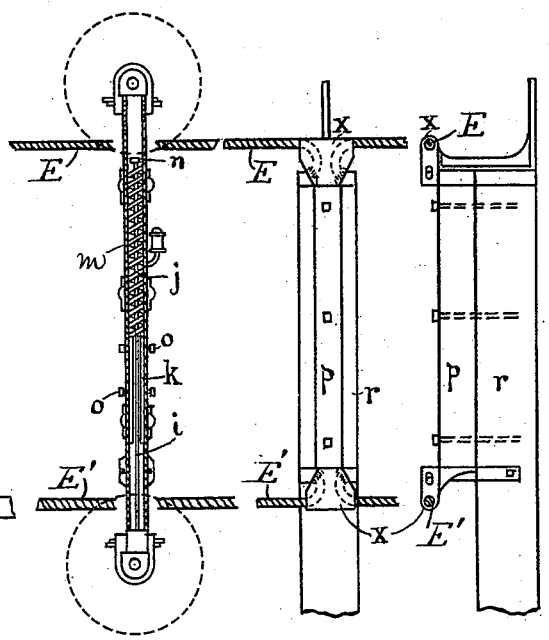
Figure 9:
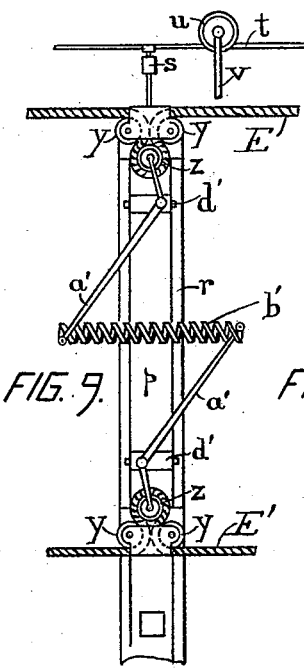
Figure 10:
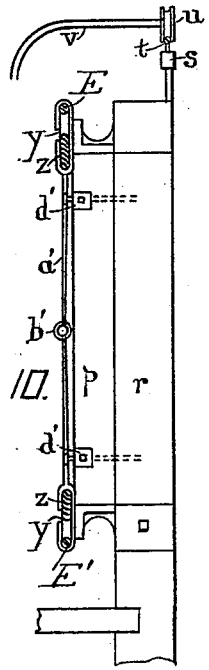
Figure 11:
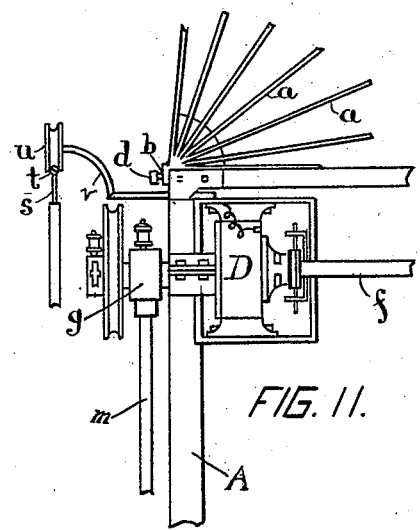
Figure 12:
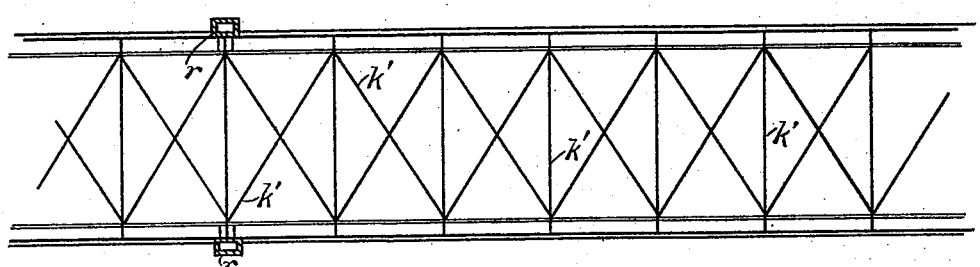
Figure 13:
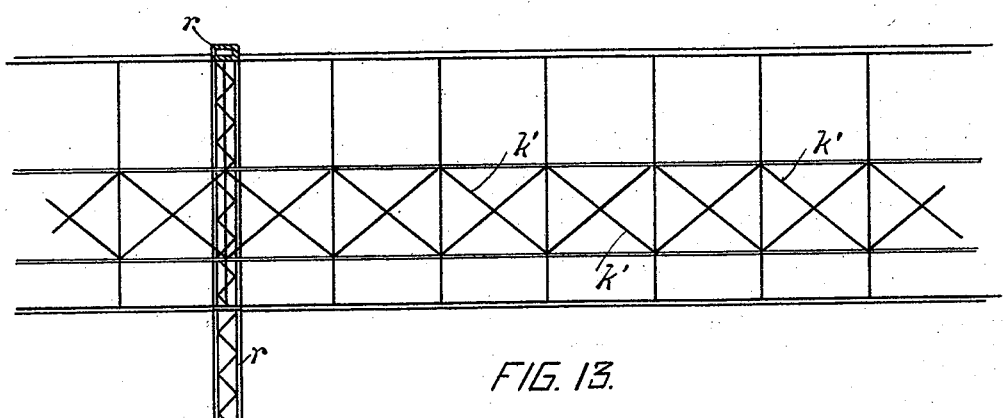
Figure 14:
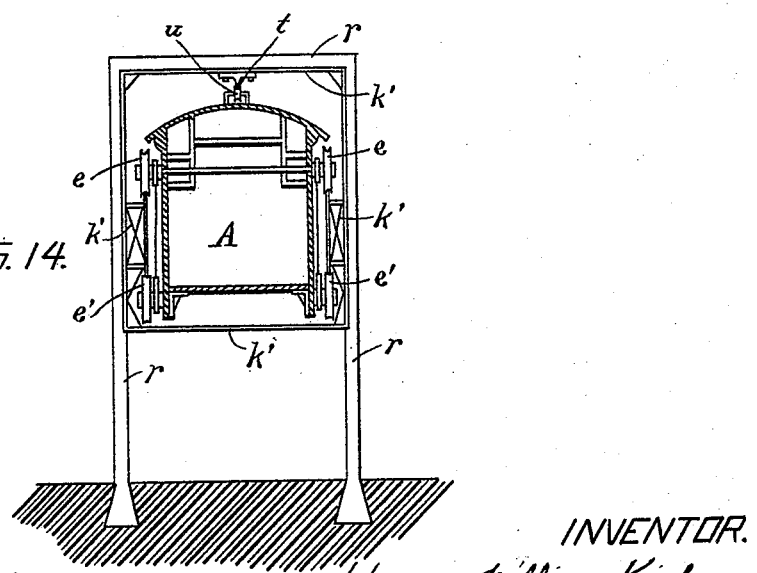

In the accompanying drawings, Figure 1 is a side view of our car with a gas-receiver attached, showing the guide rails or tracks and supports and the general arrangement of the supporting and clamping grooved pulleys attached to the car, and showing, also, in dotted lines the position of the internal bracing of the gas-receiver, hereinafter described. Fig. 2 is a plan of the car and tracks with the gas-receiver removed, showing by the dotted line the horizontal outline of the gas-receiver. Fig. 3 is a cross-section of the car with the gas-receiver attached and roadway, showing the general arrangement of the guide rail or tracks, the position of the electrical-supply wire, hereinafter described, and the arrangement of one set of the internal bracing-rods of the gas-receiver. Figs. 4 and 5 are respectively side and edge elevations of the upper and lower grooved supporting or guide pulleys, Fig. 5 showing in cross-section the form of the pulleys. Fig. 6 is a sectional view of the bar connecting the upper and lower pulleys, showing the adjustable spring-connection between them. Figs. 7 and 8 are respectively front and side views of the supporting-piece for the tracks or rails, showing the means for making fast the ends of the cables when they are used as a track, as hereinafter specified. Figs. 9 and 10 are respectively a front and side view of the device used to support the guide-tracks and stretch or balance the tension on the cables, showing, also, the means for supporting the electrical-supply wire. Fig. 11 is a more detailed view of the method of fastening the gas-receiver to the car and the arrangement of the internal bracing-rods, also the position of the electrical motor. Figs. 12, 13, and 14 are views of a modified form of roadway, doing away with the gas-receiver, but still making use of the double side tracks. Fig. 12 is a top view of a roadway, showing the arrangement of the stays or bracing-pieces of the frame-work of the roadway. Fig. 13 is a side elevation of the roadway and car. Fig. 14 is a cross-section of the roadway and car, showing more particularly the position of the electrical supply-wire and contact-maker.

Like letters of reference denote like parts in the several figures.

To the body A of the car is attached a gas-receiver B by some suitable means, preferably by a loop b, formed by the united ends of a set of internally-bracing rods a, as shown in Fig. 11. These rods are made of some light material, preferably aluminum. To each side of the car A a set of upper and lower supporting or guide-grooved wheels or pulleys e and e' is secured. The form of these pulleys is shown in the sectional view of e in Fig. 5. The axles f of the wheels e extend through the car, the two wheels on the opposite sides of the car being on the same axle and have their journal-bearings g rigidly secured to the car. The journal-bearings g' for the wheels e' are attached to the car, so as to move up and down in the V-shaped grooves in a clamping or securing block h, rigidly secured to the car. The upper and lower wheels are connected together by a rod i, attached to the journal-box g', extending up into the hollow connecting-bar m, which is an extension of the journal-bearings g. (Shown in Fig. 6.) The upper end of the rod i is flared out or run through a washer and headed, forming a shoulder n, which rests on the top of a spiral spring j. The bottom of the spring j rests on a shoulder made by the top end of the adjusting-tube k let into and fitting inside the connecting-bar m, and secured at a definite position by the set-screws o let into the side of the bar m. The tendency of the spring j is to draw the upper and lower wheels together, the upper wheel being above the upper track E and the lower wheel being below the lower track E' to prevent the wheels from leaving the track, and also furnishes enough track-friction for the motive power as applied to the axle of the wheels to propel the car. The resultant tendency in practice is therefore to draw the upper and lower rails together. This is prevented by the supports for the tracks being respectively on the upper and lower ends of the bracket-piece p, which at the same time offsets the tracks from the supporting posts or pillars r, as shown in Figs. 8 and 10. On the top of these supporting-posts, which are made of suitable material and firmly set in the ground and braced, is placed a standard s (shown in Fig. 10) to support the electrical supply or trolley wire t. A grooved contact or trolley wheel u travels on this wire, and is secured to the body of the car, preferably by an arm v with a hinged joint, so that the wheel is kept in contact with the wire by its own weight. From this contact-wheel the electricity is led by suitable conductors to the electric motor D, which is placed in the car with its armature directly on the axle of the upper set of wheels, as shown in Fig. 11, with suitable means for regulating the electrical current. At places where the cable is broken the ends of the supporting-piece p are formed with two holes x, so arranged that when the opposing ends of the cable are passed through and the strands of them wedged out, so as not to be withdrawn, the cable at the joint presents a continuous track, as shown in Fig. 7. At convenient intervals the ordinary supports described are replaced by supports with equalizing or stretching devices attached thereto. (Shown in Figs. 9 and 10.) The stretching device consists in two small grooved pulleys y, placed near each other on one end of the piece p, between which a loop of the cable is drawn and passed over a third pulley z, which is attached to the short or free end of the stretching-lever a'. The bent lever a' is fulcrumed on a pivot-bolt d' and connected at its long end with the corresponding end of the lever of the stretcher for the lower cable by a spiral tension-spring b'. The tendency of the spring b' is to bring the ends of the two levers together, thereby keeping the cable stretched.

It is obvious that instead of cables for guide or traction rails bars of iron or pipe properly secured to the supports may be used and fulfill the same purpose. It will also be understood that we have described electricity as one of several sources of motive power that might be used.

In Figs. 12, 13, and 14 we have illustrated a modified form of our roadway in which we have dispensed with the compensation gas-receiver and made the roadway comparatively stronger by the stay and bracing rods k', but still retaining our four-rail roadway. We have in this modified form placed the trolley-wire t and contact-wheel u above the center of the car, as shown in Fig. 14.

We claim—

1. In an elevated railway, the combination, with the track, consisting of supporting-posts having brackets secured thereto and guide-rails secured to the upper and lower ends of said brackets, of a car suspended between said rails and having a gas-receiver rigidly secured to the top thereof, upper traction-rollers journaled in bearings on opposite sides of the car and adapted to run on the rail, and lower guide-rollers journaled in vertically-movable bearings on opposite sides of the car, substantially as and for the purposes described.

2. In an elevated railway, the combination, with the upper and lower rails, of a car having a weight-compensating gas-receiver rigidly secured to the top thereof, traction-wheels secured to the ends of a power-driven shaft journaled in stationary bearings at the top of said car, guide-rollers journaled in vertically-movable bearings on opposite sides of the car, and a yielding connection between the bearing of the upper and lower rollers, substantially as and for the purposes described.

3. In an elevated railway, the combination of a car, a gas-receiver, upper and lower wheels secured to both sides of the car, the journal-bearings for the upper one rigidly secured to the car, its axle extending through the car on which the upper wheel on the opposite side of the car is secured, the journal-bearing for the lower wheel being secured to the car in such manner as to permit of a vertical movement in relation to the car, and means for adjustably drawing the upper and lower wheels together, consisting in a spring connecting the extended ends of the journal-bearings, tracks or rails for said wheels to run on, supports for the tracks, and motive power to propel the car, substantially as described.

4. In an elevated railway, the combination of a car, gas-receiver, guide and traction wheels, a roadway consisting in four tracks or rails, preferably formed by tightly-stretched cables, an upper and lower one on each side of the roadway, means for securing the joint ends of the cables, means for stretching the cables, consisting in spring-governed levers carrying the stretching-pulleys on their ends, suitable supports for the tracks, and motive power for propelling the car, substantially as described.

In testimony whereof we have affixed our signatures in presence of two witnesses.

H. W. KIRCHNER.
GEORGE N. CHASE.

Witnesses to the signature of H. W. Kirchner:
CHAS. E. MAJOR,
G. C. DE BRONKARSF.

Witnesses to the signature of George N. Chase:
E. T. BARBER,
JULIA L. CHASE.